US007464906B2

(12) United States Patent
Temperato et al.

(10) Patent No.: US 7,464,906 B2
(45) Date of Patent: Dec. 16, 2008

(54) ORIENTABLE MOUNTING FOR OPTICAL AND/OR PHOTO-CINEMATOGRAPHIC EQUIPMENT

(75) Inventors: Luca Temperato, Bassano Del Grappa (IT); Stelvio Zarpellon, Bassano Del Grappa (IT)

(73) Assignee: Lino Manfrotto + Co. S.p.A., Bassano del Grappa (VI) (IT)

( * ) Notice: Subject to any disclaimer, the term of this patent is extended or adjusted under 35 U.S.C. 154(b) by 0 days.

(21) Appl. No.: 11/661,728
(22) PCT Filed: Aug. 8, 2005
(86) PCT No.: PCT/EP2005/008574

§ 371 (c)(1),
(2), (4) Date: Mar. 1, 2007

(87) PCT Pub. No.: WO2006/027067

PCT Pub. Date: Mar. 16, 2006

(65) Prior Publication Data

US 2007/0267553 A1 Nov. 22, 2007

(30) Foreign Application Priority Data

Sep. 10, 2004 (IT) .......................... PD2004A0227

(51) Int. Cl.
*F16M 11/02* (2006.01)
(52) U.S. Cl. ................ 248/181.1; 248/183.1; 248/183.2
(58) Field of Classification Search .............. 248/181.1, 248/583, 288.31, 288.51, 181.2, 183.1, 184.1, 248/183.2, 176.1, 183.3, 187.1, 481, 482, 248/483, 484, 485; 403/56, 55, 57, 373, 403/90
See application file for complete search history.

(56) References Cited

U.S. PATENT DOCUMENTS 1,798,446 A * 3/1931 Zerk ........................ 248/181.1

(Continued)

FOREIGN PATENT DOCUMENTS

FR          1 317 518         2/1963

(Continued)

OTHER PUBLICATIONS

International Search Report for PCT/EP2005/008574 dated Nov. 11, 2005.

*Primary Examiner*—Anita M King
(74) *Attorney, Agent, or Firm*—RatnerPrestia

(57) ABSTRACT

An orientatable mounting for optical and/or photo-cinematographic equipment including at least one universal joint having a first and a second joint component which are movably coupled together, a member applying an immobilizing friction load between the joint components including a hydrostatic pressure source and actuator for operative control of the pressure member, and the hydrostatic pressure source including a first and a second piston member. The first piston member acting on one of the joint components and the second piston member capable of being displaced through a selectively controllable actuator to induce a hydrostatic pressure in a fluid source which is to be transferred to the first piston member consequently exerting an immobilizing friction force between the joint components, and the actuator includes a first actuator member for operative control of the second piston member in order to generate the preselected immobilizing load between the joint components and a second separate actuator member to selectively control the second piston member in generating a relative friction load between the joint components independently of the immobilizing load obtained through control of the first actuator member.

20 Claims, 4 Drawing Sheets

U.S. PATENT DOCUMENTS

| | | | | |
|---|---|---|---|---|
| 2,180,214 A | * | 11/1939 | Rapp | 248/181.1 |
| 2,559,925 A | | 7/1951 | Barker | |
| 2,672,313 A | | 3/1954 | Poole | |
| 3,737,130 A | | 6/1973 | Shiraishi | |
| 4,010,923 A | * | 3/1977 | Miller et al. | 248/183.2 |
| 4,886,230 A | | 12/1989 | Jones et al. | |
| 6,352,228 B1 | | 3/2002 | Buerklin | |

FOREIGN PATENT DOCUMENTS

| | | |
|---|---|---|
| GB | 631 690 | 11/1949 |

\* cited by examiner

ORIENTABLE MOUNTING FOR OPTICAL AND/OR PHOTO-CINEMATOGRAPHIC EQUIPMENT

This application is a U.S. National Phase Application of PCT International Application PCT/EP2005/008574 which is incorporated by reference herein.

TECHNOLOGICAL FIELD

This invention relates to an orientatable mounting for optical and/or photo-cinematographic equipment.

TECHNOLOGICAL BACKGROUND

As is well known, orientatable mountings of the type indicated are used together with stands, tripods or other supports in the context of optical equipment and in particular in the specific sector of photo-cinematographic equipment to support such equipment in an orientatable way.

In known arrangements it is typically provided that one or more universal joints, for example of the spherical or cylindrical type, provided on the mounting for orientatable positioning of the same can be immobilized in the preselected spatial position through the application of friction locking forces exerted by means of pressure screws acting directly on the components of the joints or through the intermediary of resilient spring means.

Other known arrangements provide for the use of means applying a load of the hydrostatic type, for example comprising hydraulic piston devices to which a hydraulic thrust produced by adjusting the pressure within the piston chamber is transferred. One example of a hydrostatic system for immobilizing the universal joint of an orientatable mounting is known from U.S. Pat. No. 4,886,230.

Although advantageous in comparison with systems of a solely mechanical nature, in particular through the greater efficiency which can be obtained in applying the immobilizing forces, the hydrostatic immobilizing system proposed nevertheless has some limitations both in terms of the accuracy of positioning and gradual application of immobilizing forces to the joint which can be achieved, particularly when adjusting the so-called friction load, which is separate from the effective immobilizing load and is created between the components of the joint to permit readier and more accurate positioning movement of the mounting with respect to the support.

DESCRIPTION OF THE INVENTION

The principal object of the invention is to provide an orientatable mounting for optical and/or photo-cinematographic equipment which is structurally and functionally designed to overcome the abovementioned limitations while being capable of ensuring immobilization of the joint components through the gradual and adjustable application of friction with great accuracy, at the same time ensuring high efficiency in immobilization of the joint in order to obtain immobilizing forces with smaller forces required from the user.

This and other objects which will be apparent below are achieved in accordance with the invention through an orientatable mounting for optical and/or photo-cinematographic equipment comprising: at least one universal joint having a first and a second joint component which are movably coupled together, means for applying an immobilizing friction load between the joint components including hydrostatic pressure means and actuator means for operative control of the pressure means, the hydrostatic pressure means including a first and a second piston member, slidably guided while maintaining a hydraulic seal in corresponding chambers which communicate with each other, a fluid means being provided in the chambers such that a thrust exerted on one of the piston members is transferred to the other of the piston members, the first piston member acting on one of the joint components and the second piston member being capable of being displaced through selectively controllable actuator means from outside the chambers to induce a hydrostatic pressure in the fluid means which is to be transferred to the first piston member consequently exerting an immobilizing friction force between the joint components, and the actuator means including a first actuator member for operative control of the second piston member in order to generate the preselected immobilizing load between the joint components and a second separate actuator member to selectively control the second piston member in generating a relative friction load between the joint components independently of the immobilizing load obtained through control of the first actuator member.

BRIEF DESCRIPTION OF THE DRAWINGS

Other advantages and characteristics of the present invention will become clear from the following detailed description which is given with reference to the appended drawings which are provided purely by way of non-limiting example and in which.

DETAILED DESCRIPTION OF THE INVENTION

Figure 1:
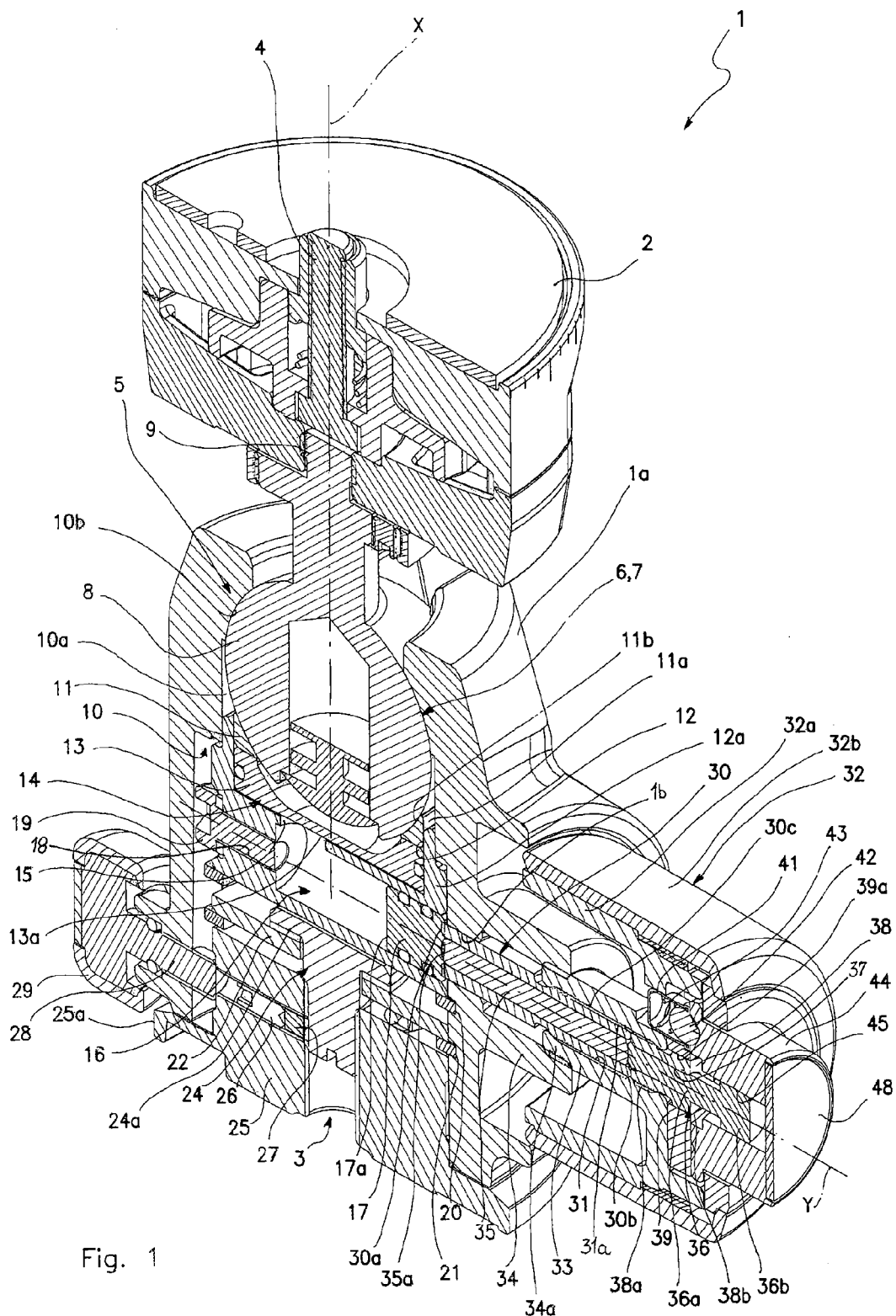
FIG. 1 is a perspective view in longitudinal cross-section of an orientatable mounting according to a first embodiment of this invention.
Figure 2:
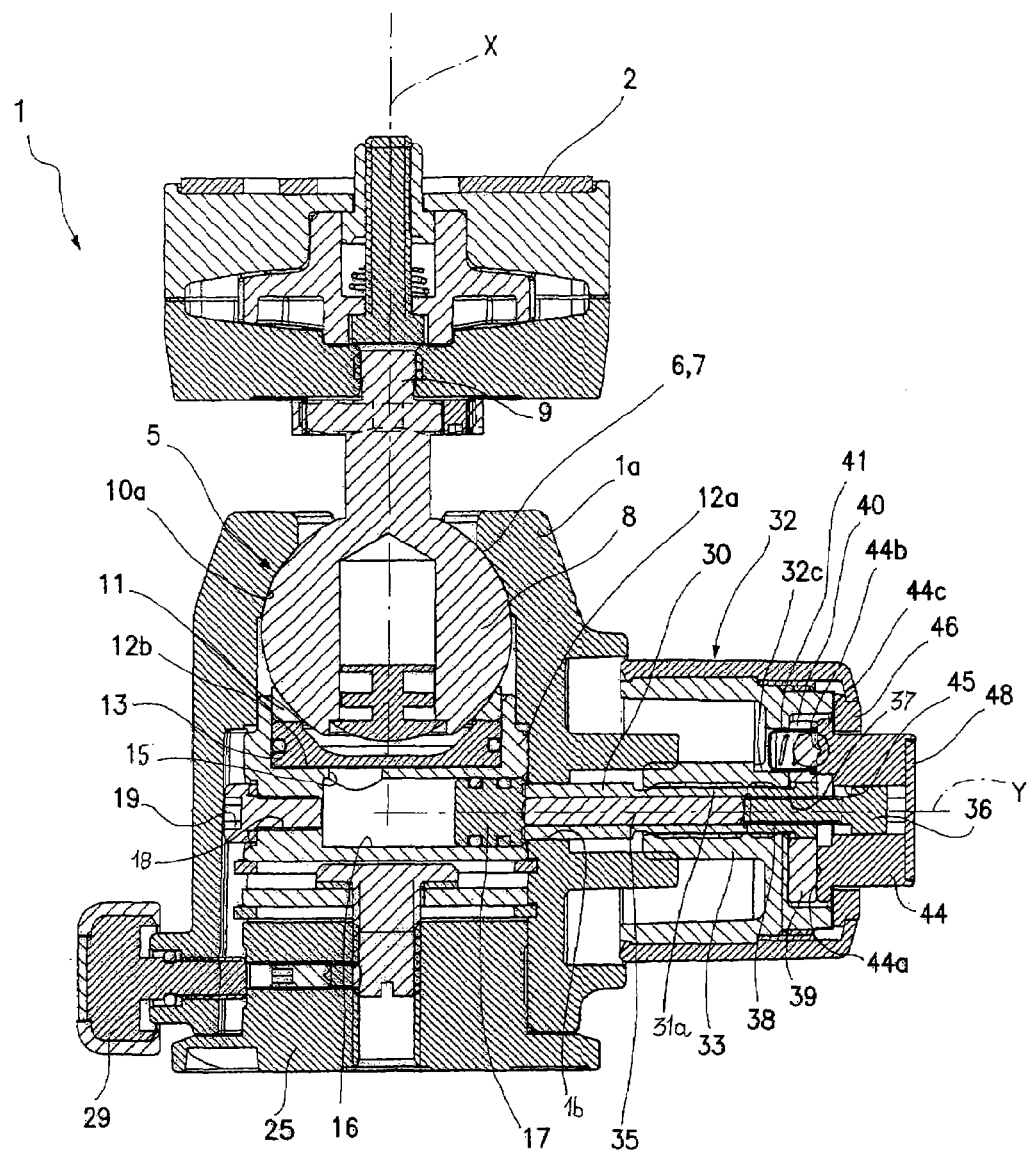
FIG. 2 is a view of the orientatable mounting in FIG. 1 in axial cross-section.
Figure 3:
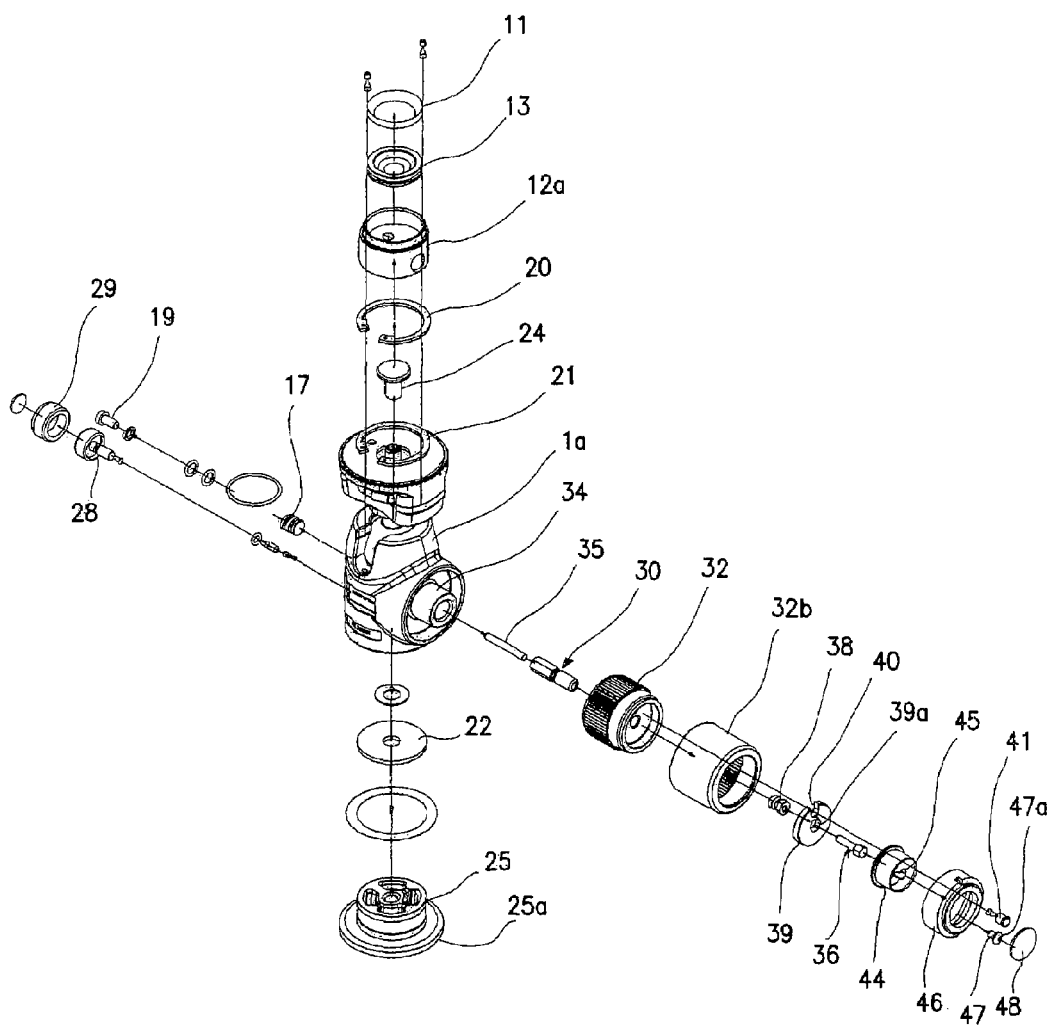
FIG. 3 is an exploded perspective view of the orientatable mounting in the preceding figures.

With reference to the figures mentioned, 1 indicates as a whole an orientatable mounting constructed in accordance with this invention which is capable of orientating in space a plate 2 supporting optical and/or photocinematographic equipment with respect to a stand or other support which is not shown in the figures. Mounting 1 is removably attachable to the stand structure through a threaded hole attachment 3 provided on the mounting opposite plate 2.

A corresponding thread attachment 4 which is capable of being screwed into a corresponding portion of the aforesaid equipment in order to secure it relative to the plate is provided on plate 2.

Mounting 1 comprises a spherical joint 5 including a first and a second joint component, indicated by 6 and 7 respectively, which are movably coupled together.

First joint component 6 comprises a spherical joint member 8 extended by an appendage with a threaded shank 9 which can be secured to plate 2, while second joint component 7 comprises a cavity 10 provided in a main body 1a of the mounting (which can be secured to the stand) and forming a seat which rotatably receives spherical joint member 8 so as to provide a spherical joint coupling between the attachment plate for the equipment and the orientatable mounting portion attached to the stand.

More particularly cavity 10 comprises a first section 10*a* of cylindrical shape extended by a second section 10*b* shaped as a segment of a sphere which defines the spherical coupling surface with joint member 8.

Means for applying an immobilizing friction load of the hydrostatic type are provided for achieving relative immobilization between joint components 6, 7. The said means comprise a pressure ring 11 having an outer cylindrical skirt 11*a* axially guided in a seat 12 of a body 12*a* which is in turn housed within cavity 10 and is attached thereto. Pressure ring 11 is guided axially along a direction identified by the X axis in FIG. 1 and has an inner surface 11*b* of spherical shape which can make contact with a corresponding surface portion of spherical joint member 8 to generate the immobilizing friction forces between the latter and the seat of the joint.

A first piston member 13, which is placed between ring 11 and base 12*b* of the seat, is also mounted in seat 12. This is slidably guided in seat 12, maintaining a hydraulic seal, coaxially with pressure ring 11, and can be moved in the direction of the ring through hydraulic pressure forces generated in a first chamber 14 formed between piston 13 and base 12*b* of seat 12. In this space there is also a passage 15 which places first chamber 14 in fluid communication with a second cylindrical chamber 16 in which a second hydraulically controlled piston member 17 is slidably guided maintaining a hydraulic seal. Second piston 17 can move in a Y direction perpendicular to the X axis. Second chamber 16 is also in communication with the exterior through a through hole 18 which can be obstructed through a screw plug 19, through which the fluid means for hydraulic control of the pistons, for example a hydraulic oil of low compressibility, is delivered to (and if necessary discharged from) chambers 14, 16.

It will be noted that as a result of fluid communication between chambers 14, 16 stresses induced from the exterior on second piston 17 in the manner described below will be transferred (as a result of the hydraulic pressure generated) to first piston 13 with a magnitude which is increased through a multiplication factor correlated in proportion to the ratio between the hydraulic thrust surface areas of the first and second pistons indicated by 13*a*, 17*a* respectively.

A first resilient ring 20 immobilized on cavity 10 which forms a corresponding shoulder for axially retaining body 12*a*. A second resilient ring 21 is mounted in cavity 10 coaxially with the first ring and in a position which is axially at a distance from the latter. A further ring 22, through the central hole of which the threaded shank of a screw member 24 having a head 24*a* passes, is located coaxially between the said elastic rings. This head is axially retained between the ring 22 and a surface of body 12*a* opposite it in such a way that screw 24 is rotatably supported in cavity 10 with freedom to rotate about the X axis. The threaded shank of screw 24 also engages the female thread of a central through hole in a cylindrical flange 25 partly inserted into cavity 10 and projecting therefrom with a broad base 25*a*. Flange 25 is secured to rotatable screw 24 through a bolt 26 screwed into a radial hole in the flange and acting on a small immobilizing cylinder 27 thrust against the shank of the screw. Flange 25 can in turn be immobilized in rotation with the principal body of the mounting through a radial immobilizing screw 28 passing through body 1*a*, the screwing of which can be controlled by means of an external knob 29. Because flange 25 can in turn be fixed to the stationary structure of the stand supporting the mounting via base 25*a*, body 1*a* of the mounting is rotatably supported on the flange about the X axis and this rotation can be immobilized or released through operating knob 29.

In order to displace piston 17 provision is made for a first actuator shaft 30 of a tubular shape which is slidably guided within body 1*a* along the Y axis as a result of the connection between a section thereof having a transverse cross-section of polygonal shape and a through opening 1*b* of corresponding polygonal (for example hexagonal) cross-section provided in body 1*a* of the mounting. Shaft 30 acts via an axial extremity 30*a* against piston 17, from the side opposite surface 17*a* of the latter, while at the opposite axial extremity 30*b* the shaft has an externally threaded section 30*c* which can be screwed into the female thread 31*a* of a hole 31 passing centrally through a knob body indicated as a whole by 32.

More particularly hole 31 extends axially at least partially along a cylindrical appendage 33 projecting centrally from the knob. The outer skirt of said appendage 33 is also threaded along a section of the extremity of the same and can in turn be screwed into a threaded hole 34*a* provided in the extremity of a tubular formation 34 extending from body 1*a* of the mounting coaxially with the Y axis. It should be noted that through the provision of the aforesaid male and female screw couplings angular rotation of knob 32 about the Y axis is first of all converted into a lateral movement of the knob along the said Y axis (through threaded connection 33-34*a*) and this lateral movement is also induced in the actuator shaft (screwed to the knob). This displacement is associated with a further axial displacement of the shaft through the effect of threaded coupling 31*a*-30*c*. As a result shaft 30 is advantageously subjected to the combination of lateral movements along the Y axis generated by rotation of the knob through the effect of both the threaded couplings described above.

Knob 32 is provided with a graspable cylindrical shell portion 32*a* onto which a covering sleeve 32*b* is suitably fitted. This sleeve is integral with the knob in both lateral movement and rotation relative to the Y axis. In this respect torsional coupling is ensured by the corresponding mutually engaging grooved profiles between the knob and the sleeve.

A second actuator shaft 35 which is movably located with restricted radial play in the central hole passing axially through shaft 30 is provided in addition to shaft 30. Shaft 35 is active with an extremity 35*a* thereof against piston 17, opposite surface 17*a* of the latter, while the opposing axial extremity can come into contact with a thrust screw 36 extending coaxially with the shaft and having a threaded shank 36*a* connected to a head 36*b*. Shank 36*a* is screwed into the female thread of a hole 37 passing centrally through a bush 38. The latter has a first axial section 38*a* which is threaded externally and screwed into the female thread of hole 31, in a position contiguous with first actuator shaft 30, and a second section 38*b* which has a polygonal, for example hexagonal, profile in transverse cross-section. This section 38*b* is slidably guided along the Y axis in a hole 39*a* of corresponding polygonal cross-section passing centrally through a ring 39 mounted coaxially with knob 32. A recess 40 which when assembled is located in a position axially facing a cavity 32*c* provided in knob 32 is provided in ring 39. The latter knob and ring 39 are made integral in rotation through engaging a cylindrical shell 41 which engages partly in cavity 32*c* and partly in recess 40. This shell also comprises a seat receiving a small sphere 42 which is resiliently stressed through a spring 43 against surface 44*a* of a second knob 44 rotatably supported in knob 32 about the Y axis, whose function will be clearly apparent from the description below. Impressions 44*b* which are located with a regular angular spacing and which can be engaged by the spring-loaded small sphere in rotation of the knob in order to obtain a "click" movement of the same with regularly spaced release are provided on surface 44*a*.

This second knob 44 has a central axial through opening 45 and a cross-section of polygonal shape so as to slidably receive the head 36b of screw 36 providing axial guidance. Knob 44 is also provided with a basal circular projection 44c through which it is axially retained in first knob 32. In particular projection 44c is held in a position abutting ring 39 by a further locking ring 46 which is in turn axially secured to knob 32 by an axial extremity of sleeve 32a.

Also 47 indicates a stop screw mounted in the body of knob 44 in an offset position with respect to the Y axis such that its head, indicated by 47a, can interfere with the head of thrust screw 36 thus acting as means bounding the axial travel of screw 36.

Finally 48 indicates a member closing off knob 44 in the form of a circular plate located in a corresponding seat provided in the body of the knob and axially secured thereto by screw means.

During operation friction immobilization of the spherical joint is achieved through a rotational movement of principal knob 32 which is converted into an axial displacement of first actuator shaft 30 which in turn acts against piston 17 to generate a hydrostatic pressure in chambers 14, 16 stressing piston 13 and as a result pressure ring 11 which is designed to stress joint member 8 with a force such as to generate a friction stress between the contact surfaces of spherical joint 5, thus bringing about immobilization of the joint, is displaced.

Axial movement of second actuator shaft 35, which is used to preset a preselected level of friction between components 6, 7 of the joint in relation to the user's requirements in such a way as to assist positional adjustment of the equipment before the stage of effective immobilization of the joint and during the stage of releasing the same is instead controlled through inner knob 44.

Through rotating second knob 44 second actuator shaft 35 is thereby axially displaced until it reaches a preselected position corresponding to the preset level of friction desired. This friction is generated by the hydrostatic stresses induced by the load exerted by shaft 35 on piston 17. From this condition, once the desired spatial position of the mounting has been selected, immobilization of the joint is brought about by rotating principal knob 32 which through axial displacement of piston 17 generates the friction forces necessary for immobilization. It will be noted that during the release stage, through reverse rotation of knob 44, actuator shaft 35 is drawn back and piston 17 is consequently drawn back until the latter again abuts against second actuator shaft 35, thus reaching the position corresponding to the degree of friction previously set. Further unscrewing of principal knob 32 does not affect the level of friction previously set and therefore the preselected friction is maintained independently of the unscrewing of the aforesaid principal knob.

A stop to the movement of screw 36 and consequently friction shaft 35 is also set by the axial positioning of thrust screw 36.

Figure 4:
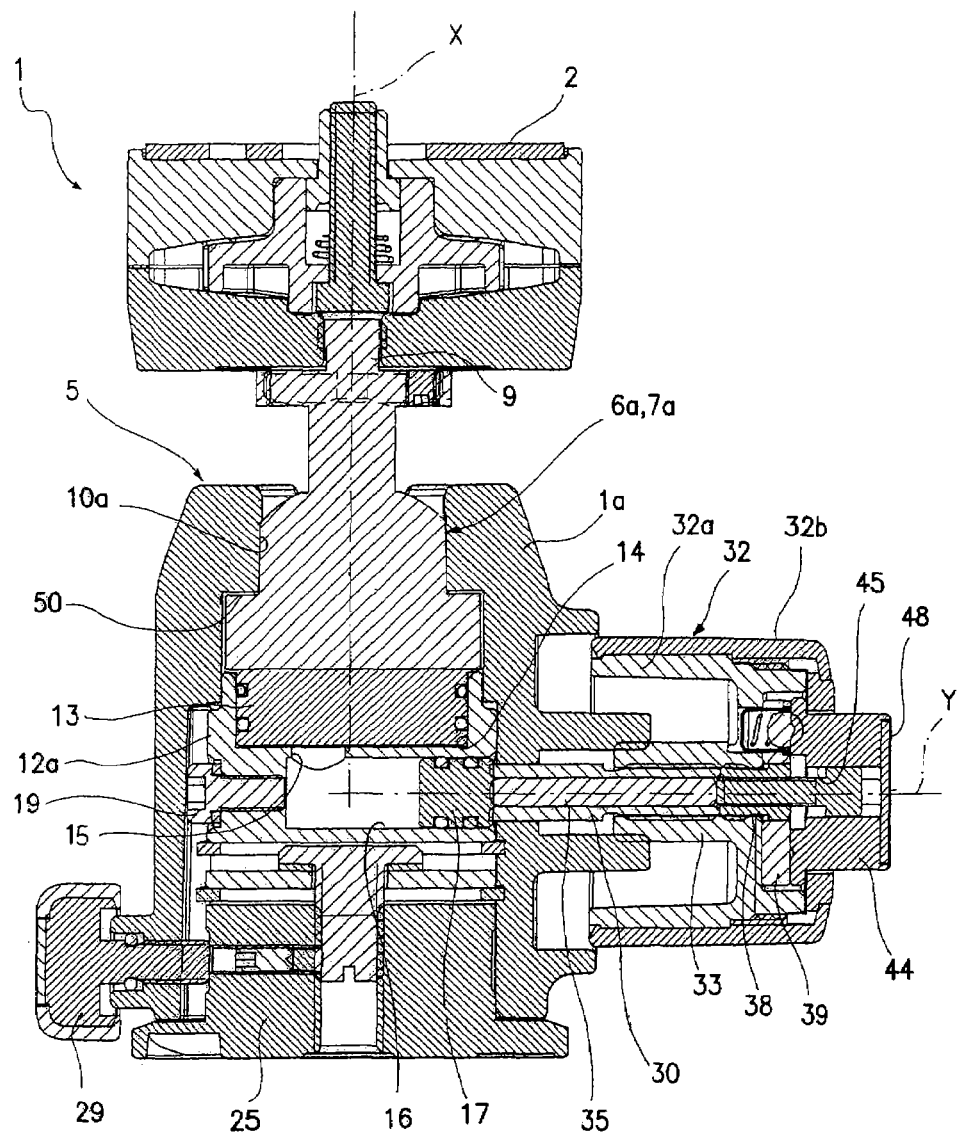
FIG. 4 is a view in axial cross-section of a second embodiment of the orientatable mounting according to the invention.

FIG. 4 illustrates a second embodiment of the orientatable mounting according to the invention in which details which are similar to those in the preceding embodiment are indicated using the same reference numbers.

This variant embodiment mainly differs in the fact that it provides a joint 5 of the cylindrical type, instead of a spherical one, in which the first joint component 6a, which has a cylindrical shape with an axis of axial symmetry X, is rotatably housed in a corresponding cylindrical cavity 10a forming the second joint component 7a.

A shoulder surface 50 in cavity 10a, against which a corresponding surface portion of the first joint component 7a can abut in order to develop the friction forces necessary for relative immobilization of the joint components relative to the joint axis X.

Axial movement of the first joint component along the X axis is achieved by controlling lateral movement of piston 13 through a thrust generated by the pressure forces induced in the same way as described in the previous embodiment.

The invention thus achieves the proposed aims providing many advantages in comparison with known arrangements.

A first principal advantage lies in the greater efficiency which can be achieved with the orientatable mounting according to the invention, in that the provision of pressure means of a hydrostatic nature makes it possible to apply smaller forces for the same immobilizing forces developed in comparison with known arrangements.

Another advantage lies in the greater accuracy of positioning which can be achieved with orientation of the mounting according to the invention, in particular thanks to the adjustability of the level of friction between the joint components.

The invention claimed is:

1. An orientatable mounting for optical and/or photo-cinematographic equipment comprising: at least one universal joint having a first joint component and a second joint component which are movably coupled together, means for applying an immobilizing friction load between the joint components including hydrostatic pressure means and actuator means for operative control of the pressure means, the hydrostatic pressure means including a first piston member and a second piston member, slidably guided while maintaining a hydraulic seal in corresponding chambers which communicate with each other, a fluid means being provided in the said chambers such that a thrust exerted on one of the piston members is transferred to the other of the piston members, the first piston member acting on one of the joint components and the second piston member being capable of being displaced through selectively controllable actuator means from outside the chambers to induce a hydrostatic pressure in the fluid means which is to be transferred to the first piston member consequently exerting an immobilizing friction force between the joint components, and the actuator means including a first actuator member for operative control of the second piston member in order to generate the preselected immobilizing load between the joint components and a second separate actuator member to selectively control the second piston member in generating a relative friction load between the joint components independently of the immobilizing load obtained through control of the first actuator member.

2. The mounting according to claim 1, in which the second actuator member forms means for limiting the operating travel of the second piston member when releasing the universal joint through control of the first actuator member in such a way that the selected friction load is maintained between the joint components independently of the operating position of the first actuator member in its movement away from the second piston member.

3. The mounting according to claim 1, in which the first and second actuator members comprise a corresponding first and second actuator shaft movably associated with each other along the thrust direction of the second piston member.

4. The mounting according to claim 3, in which the first actuator shaft is controlled in lateral movement coaxially with the second piston member, threaded coupling means and counter-means being provided between the first actuator shaft and a first knob rotably supported on the mounting coaxially with the first actuator shaft to convert a rotational movement of the knob into a corresponding lateral movement of the first actuator shaft towards and away from the second piston member.

5. The mounting according to claim 4, in which the second actuator shaft is controlled in lateral movement coaxially with the first actuator shaft, corresponding threaded coupling means and counter-means being provided between the second actuator shaft and a corresponding second knob rotatably supported on and coaxially with the first knob so that a rotational movement of the said second knob is converted into a lateral movement of the second actuator shaft towards and away from the second piston member.

6. The mounting according to claim 5, in which the first actuator shaft has a tubular shape such as to slidably receive the second actuator shaft within it.

7. The mounting according to one or more of claim 3, in which the position of the second actuator shaft correlating with a preselected friction load is adjustable.

8. The mounting according to claim 7, in which the joint is of the spherical type.

9. The mounting according to claims 1, in which the first piston member acts on a pressure ring coaxially guided onto the first piston member and having a surface portion of spherical shape coupling with a corresponding portion of the spherical component of the joint.

10. The mounting according to claim 1, in which the joint is of the cylindrical type.

11. The mounting according to claim 10, in which the axis of the joint is coaxial with the direction of movement of the first piston member, a shoulder surface being provided between the joint components transverse to the joint axis in order to generate the immobilizing friction load as a result of the hydrostatic thrust exerted on the first piston member.

12. The mounting according to claim 1, in which an hydraulic fluid controlling the piston members is a fluid having low compressibility.

13. The mounting according to claim 1, in which the first and second piston members comprise corresponding hydrostatic thrust surfaces, the magnitude of the surface area of the first piston being greater than the surface area of the second piston, the ratio between the surface areas being correlated in proportion to the multiplication factor between the thrust exerted on the second piston and that transferred hydrostatically to the first piston.

14. The mounting according to claim 1, in which the first and the second piston members are guided in their corresponding chamber while maintaining a hydraulic seal along directions which are perpendicular to each other.

15. The mounting according to claim 2, in which the first and second actuator members comprise a corresponding first and second actuator shaft movably associated with each other along the thrust direction of the second piston member.

16. The mounting according to claim 4, in which the position of the second actuator shaft correlating with a preselected friction load is adjustable.

17. The mounting according to claim 2, in which the joint is of the spherical type.

18. The mounting according to claim 8, in which the first piston member acts on a pressure ring coaxially guided onto the first piston member and having a surface portion of spherical shape coupling with a corresponding portion of the spherical component of the joint.

19. The mounting according to claim 2 , in which the joint is of the cylindrical type.

20. The mounting according to claim 2, in which an hydraulic fluid controlling the piston members is a fluid having low compressibility.

* * * * *